United States Patent
Arimilli et al.

(10) Patent No.: US 6,587,926 B2
(45) Date of Patent: *Jul. 1, 2003

(54) INCREMENTAL TAG BUILD FOR HIERARCHICAL MEMORY ARCHITECTURE

(75) Inventors: Ravi Kumar Arimilli, Austin, TX (US); John Steven Dodson, Pflugerville, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 09/903,729

(22) Filed: Jul. 12, 2001

(65) Prior Publication Data

US 2003/0014593 A1 Jan. 16, 2003

(51) Int. Cl.[7] .............................................. G06F 12/00
(52) U.S. Cl. ........................ 711/122; 711/141; 711/117
(58) Field of Search ................................ 711/122, 141, 711/117

(56) References Cited

U.S. PATENT DOCUMENTS 5,539,895 A * 7/1996 Bishop et al. .............. 711/138
5,671,371 A * 9/1997 Kondo et al. ............... 710/311

OTHER PUBLICATIONS

U.S. patent application Ser. No. 09/903,728, Arimilli et al., filed Jun. 29, 2001.
U.S. patent application Ser. No. 09/903,727, Arimilli et al., filed Jun. 29, 2001.

* cited by examiner

Primary Examiner—Reginald G. Bragdon
Assistant Examiner—Mehdi Namazi
(74) Attorney, Agent, or Firm—Casimer K. Salys; Bracewell & Patterson, L.L.P.

(57) ABSTRACT

A method and system for managing a data access transaction within a hierarchical data storage system. In accordance with the method of the present invention, a data access request is delivered from a source device to multiple data storage devices within the hierarchical data storage system. The data access request includes a source path tag and a target address. At least one device identification tag is added to the source path tag, wherein the at least one device identification tag uniquely identifies a data storage device within each level of the hierarchical data storage system traversed by the data access request such that the data access transaction can be processed in accordance with source path information that is incrementally encoded within the data access request as the data access request traverses the hierarchical data storage system.

12 Claims, 6 Drawing Sheets

INCREMENTAL TAG BUILD FOR HIERARCHICAL MEMORY ARCHITECTURE

CROSS REFERENCE TO RELATED APPLICATIONS

The present application is related to the following copending U.S. Patent Applications: U.S. patent application Ser. No. 09/903,728 filed on Jul. 12, 2001, titled "ELIMINATION OF VERTICAL BUS QUEUEING WITHIN A HIERARCHICAL MEMORY ARCHITECTURE; and U.S. patent application Ser. No. 09/903,727 filed on Jul. 12, 2001, titled "IMPROVED SCARFING WITHIN A HIERARCHICAL MEMORY ARCHITECTURE". The above mentioned patent applications are assigned to the assignee of the present invention. The content of the cross referenced copending applications is hereby incorporated herein by reference.

BACKGROUND OF THE INVENTION

1. Technical Field

The present invention generally relates to system address transmission and in particular to a method and system for transmitting data access transactions to and from storage devices. Still more particularly, the present invention relates to a method and system for tagging data access transactions in a manner optimized for use by hierarchically configured storage devices.

2. Description of the Related Art

High performance data processing systems typically include a number of levels of caching between the processor (s) and system memory to improve performance, reducing latency in data access operations. When utilized, multiple cache levels are typically employed in progressively larger sizes with a trade off to progressively longer access latencies. Smaller, faster caches are employed at levels within the storage hierarchy closer to the processor or processors, while larger, slower caches are employed at levels closer to system memory. Smaller amounts of data are maintained in upper cache levels, but may be accessed faster.

A conventional symmetric multiprocessor data processing system may include a number of processors that are each coupled to a shared system bus. Each processor may include an on-board cache that provides local storage for instructions and data, execution circuitry for executing instructions, and a bus interface unit (BIU) that supports communication across the shared system bus according to a predetermined bus communication protocol.

In conventional multiprocessor data processing systems, each BIU maintains a single queue of all outstanding communication requests generated within the processor. The communication requests indicate a request address and a request source within the processor. To promote maximum utilization of the system bus, the BIUs typically service the communication requests utilizing split bus transactions, which permit multiple bus transactions to be chronologically interleaved. For example, the BIU of a first processor may gain ownership of the system bus and initiate a first bus transaction by driving an address and appropriate control signals. The first processor may then relinquish ownership of the system bus while awaiting receipt of data associated with the address in order to permit a second processor to perform a portion of a second bus transaction. Thereafter, the device from which the first processor requested data may complete the first bus transaction by driving the requested data, which is then latched by the BIU of the first processor.

To allow devices snooping the system bus to identify and properly route bus transactions a system address tag that identifies the request source is included within each data access request and returned with each corresponding response. Furthermore, each BIU assigns each of its bus transactions an arbitrary bus tag that is transmitted during each tenure of the bus transaction. The bus tags are typically assigned cyclically out of a pool of bus tags equal in number to the maximum number of concurrent bus transactions supported by the device. For example, the BIU of a device supporting a maximum of eight concurrent bus transactions assigns one of eight low order 3-bit tags to each of its bus transactions. The system address tags and bus tags are stored by the device in association with the appropriate queue entries.

As data storage systems continue to grow in terms of greater numbers of processors and additional cache layers, the required tag field within each system bus packet is required to expand accordingly to maintain a unique identification for each pending data access transaction. In the interest of maintaining minimally divided data storage access request packets as well as minimizing the need for additional bus pins, the tag size has been controlled by utilizing translation queues for inter-system memory accesses. The increasing prevalence of data processing architectures wherein multiple SMPs share memory resources via non-uniform memory access (NUMA) architectures, for example, has further proliferated the incorporation of tag translation queues within complex data storage systems. Although tag translation queues are effective in minimizing the required tag field size, the translation process itself adds an additional delay as well as requiring overhead comparator logic.

The need to maintain uniquely associated tags gives rise to another problem—the need to maintain designated queue positions for ongoing data storage access transactions. Conventional bus tagging methodologies require that detailed information related to the source of the transaction (the requesting processor, for example) be encoded in the tag field such that upon retrieval of the requested data, intermediate cache levels and bus switching logic can determine the correct destination. A typical bus tag may include bits fields designating the address source type, the highest package structure, a next package structure (chip), the requesting processor, the unit within the chip, and the specific queue from which the request was initiated. As a data access request descends through a memory hierarchy, a queue entry is often reserved to wait for and recognize a returned response to the access request. The information encoded within the bus tag is maintained by the reserved queue entry, which is non-allocatable to other transactions until the requested data has been returned bearing the same tag. This condition is a significant source of memory transaction bottlenecks since the transaction time for individual requests within any given data storage access request sequence is unpredictable.

From the foregoing, it can therefore be appreciated that a need exists for an improved technique for identifying data storage access transaction wherein tag size is minimized without the need for tag translation. The present invention addresses such a need.

SUMMARY OF THE INVENTION

A method and system for managing a data access transaction within a hierarchical data storage system are disclosed herein. In accordance with the method of the present invention, a data access request is delivered from a source device to multiple data storage devices within the hierarchical data storage system. The data access request includes a source path tag and a target address. At least one device identification tag is appended within the source path tag, wherein the at least one device identification tag uniquely identifies a data storage device within each level of the hierarchical data storage system traversed by the data access request such that the data access transaction can be processed in accordance with source path information that is incrementally encoded within the data access request as the data access request traverses the hierarchical data storage system.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Although, the present invention will be described herein in terms of a particular system and particular components, one of ordinary skill in the art will readily recognize that this method and system will operate effectively for other components in a data processing system. The present invention will be described in the context of a multi-level symmetric multiprocessor (SMP) architecture wherein tags are utilized by system queues to track and process data storage transactions on a system address and data bus. However, one of ordinary skill in the art will readily recognize that the present invention is also applicable to any bus transaction within a hierarchical memory structure.

Figure 1:
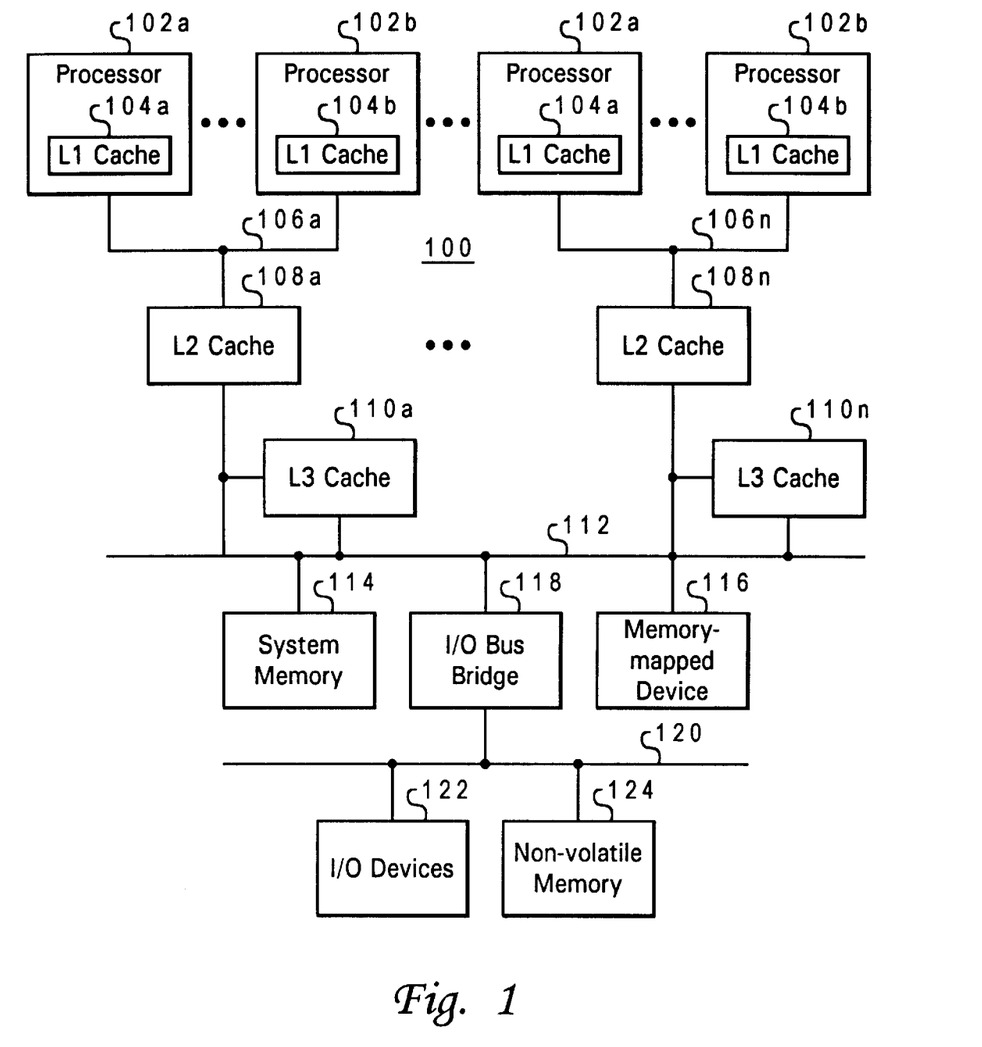
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 is a symmetric multiprocessor (SMP) system including a plurality of processors 102a through 102n. Each processor 102a–102n includes a respective level one (L1) cache 104a–104n, preferably on chip with the processor and bifurcated into separate instruction and data caches. Each processor 102a–102n is coupled via a processor bus 106a–106n to a level two cache 108a–108n, which are in-line caches shared by multiple processors in the exemplary embodiment Although in the exemplary embodiment only two processors are depicted as sharing each L2 cache, and only two L2 caches are depicted, those skilled in the art will appreciate that additional processors L2 caches may be utilized in a multiprocessor data processing system in accordance with the present invention. For example, each L2 cache may be shared by four processors, and a total of sixteen L2 caches may be provided.

Each L2 cache 108a–108n is connected to a level three (L3) cache 110a–110n and to system bus 112. L3 caches 110a–110n are actually in-line caches rather than lookaside caches as FIG. 1 suggests, but operations received from a vertical L2 cache (e.g., L2 cache 108a) are initiated both within the L3 cache 110a and on system bus 112 concurrently to reduce latency. If the operation produces a cache hit within the L3 cache 110a, the operation is cancelled or aborted on system bus 112. On the other hand, if the operation produces a cache miss within the L3 cache 110a, the operation is allowed to proceed on system bus 112.

The lower cache levels—L2 caches 108a–108n and L3 caches 110a–110n—are employed to stage data to the L1 caches 104a–104n and typically have progressively larger storage capacities but longer access latencies. L2 caches 108a–108n and L3 caches 110a–110n thus serve as intermediate storage between processors 102a–102n and system memory 114, which typically has a much larger storage capacity but may have an access latency many times that of L3 caches 110a–110n. Both the number of levels in the cache hierarchy and the cache hierarchy configuration (i.e, shared versus private, in-line versus lookaside) employed in data processing system 100 may vary.

L2 caches 108a–108n and L3 caches 110a–110n are connected to system memory 114 via system bus 112. Also connected to system bus 112 may be a memory mapped device 116, such as a graphics adapter providing a connection for a display (not shown), and input/output (I/O) bus bridge 118. I/O bus bridge 118 couples system bus 112 to I/O bus 120, which may provide connections for I/O devices 122, such as a keyboard and mouse, and nonvolatile storage 124, such as a hard disk drive. System bus 112, I/O bus bridge 118, and I/O bus 120 thus form an interconnect coupling the attached devices, for which alternative implementations are known in the art.

Non-volatile storage 124 stores an operating system and other software controlling operation of system 100, which are loaded into system memory 114 in response to system 100 being powered on. Those skilled in the art will recognize that data processing system 100 may include many additional components not shown in FIG. 1, such as serial and parallel ports, connections to networks or attached devices, a memory controller regulating access to system memory 114, etc. Such modifications and variations are within the spirit and scope of the present invention.

Figure 2:
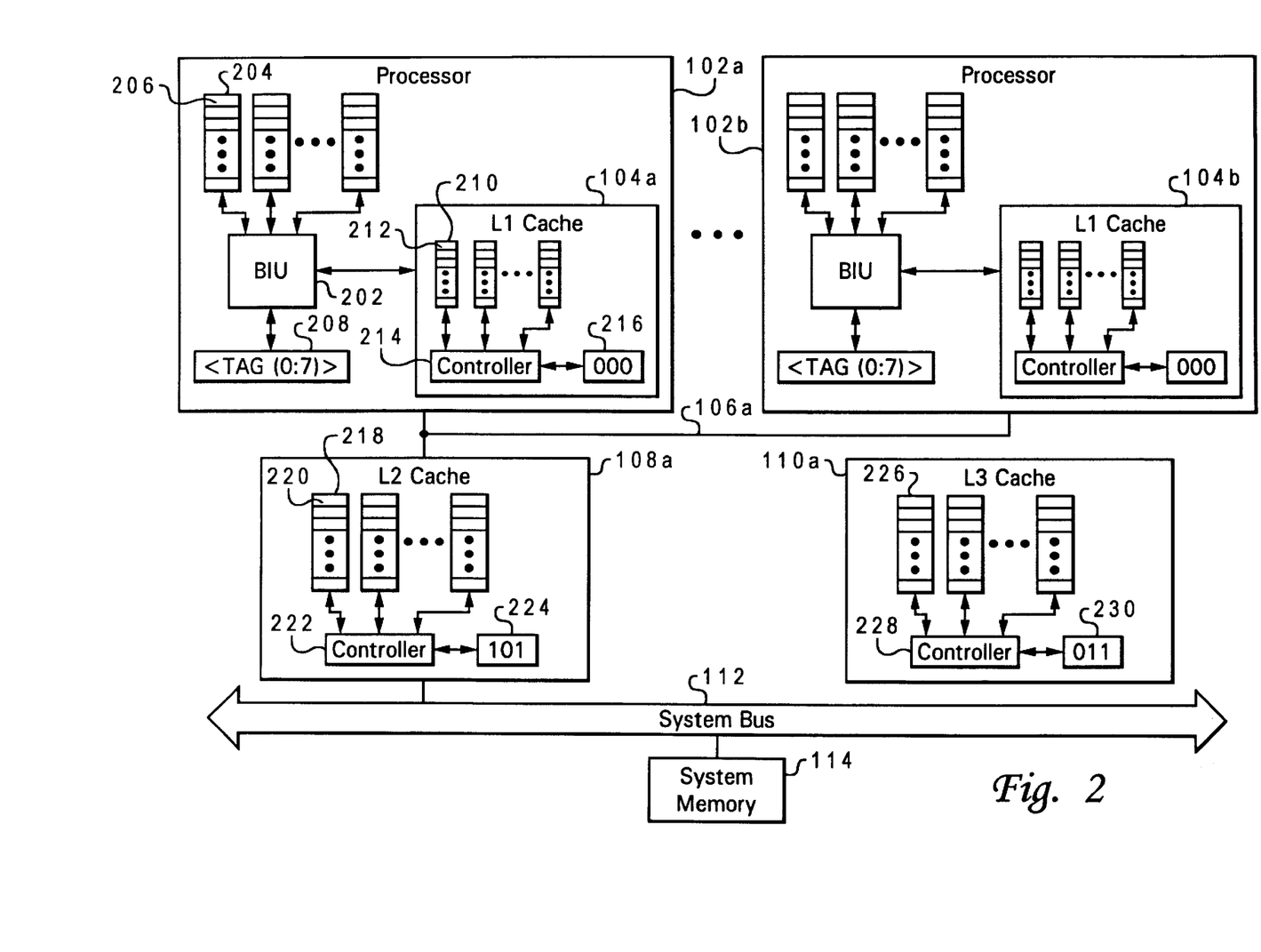
FIG. 2 is a block diagram illustrating a hierarchical data storage system, which, in accordance with the present invention, utilizes an incremental tagging infrastructure to manage a memory access transaction.

Referring now to FIG. 2, there is depicted a block diagram illustrating a more detailed embodiment of the data storage hierarchy of a representative portion of system 100, which, in accordance with the present invention, employs an incremental tagging infrastructure to dynamically track the data access request path, referred to herein as the "source path". The portion of data processing system 100 depicted includes processors 102a and 102b plus optional additional processors indicated by ellipsis notation. Processors 102a and 102b include on-board level one (L1) caches 104a and 104b, respectively, which provide local storage for instructions and data. In addition, processors 102a and 102b include bus interface units (BIUs) 202, respectively, as well as processing resources and other logic generally represented as a plurality of instruction-level queues 204. Each queue 204 includes at least one entry 206, and like caches 104a and 104b, are coupled to BIUs 202. From the perspective of BIUs 202, caches 104a and 104b and queues 204 comprise requesters that generate communication requests, which BIUs 202 service by performing communication transactions on processor bus 106a and system bus 112.

To maximize the utilization of system bus 112, devices within the data processing system depicted in FIG. 2 preferably communicate across system bus 112 utilizing split bus transactions. Prior art split bus transactions typically assign fixed end-to-end system address tags together with arbitrary bus tags to communication transactions in order to identify and route the communication transaction to which each bus tenure belongs. Such conventional tagging techniques require queues within the storage devices traversed by a data access request to reserve such system address and bus tags as the request is routed so that the corresponding data access response is identifiable to each of the path devices as the response is returned to the request source device. Very large buffers are required to accommodate such vertical queue reservation and such queues are subject to bottlenecks. The data processing system depicted in FIG. 2 addresses these problems by utilizing dynamic bus tags that are incrementally built as a given data access request from processor 102a or 102b traverses all or part of the data storage hierarchy comprising L1 cache level 104, L2 cache level 108, L3 cache level 110, and system memory 114.

In accordance with the depicted embodiment, each bus tag delivered from one of processors 102a through 102b initially includes only a source identification tag that identifies one of queues 204 as the originator of the request. As the request is received by the various cache levels, storage device identification tags are appended onto the original bus tag such that vertical queue reservation within queues 210, 220, and 226 is not required for the returning data access response. As utilized herein with reference to the figures, such bus tags will be referred to as "source path tags."

A cache controller 214 and queues 210 are incorporated within each of L1 caches 104a and 104b to facilitate data access transactions between processors 102a and 102b and processor bus 106a. Cache controllers 214 receive and transmit operations related to data within L1 caches 104a and 104b from upstream and downstream buses through BIUs 202. L2 cache 108a and L3 cache 110a similarly include cache controllers units 222 and 228 and buffer queues 218 and 226, respectively.

In response to receipt of a data access request generated by a particular entry 206 of queue 204 within processor 102a, BIU 202 services the data access request by initiating a data access transaction on processor bus 106a that includes a source path tag. A data access transaction such as a memory READ from processor 102a, is split into a request phase in which the read request is delivered to a target, and a response phase in which a read response is returned to the requester, referred to herein as the "source." Typically, the target will be a memory address that is included in one or more of the data storage devices shown in FIG. 2, while the source is the device, typically a processor or higher level storage device, that initiated the transaction. The read request is delivered over an address bus and includes a source path tag and the target memory address. For read requests initiated by processor 102a, BIU 202 appends a queue identification tag obtained from a queue identification register 208 to the source path tag. The contents of the queue identification tag specify the particular queue entry 206 in which the pending request is stored. In accordance with a preferred embodiment of the present invention, and as further explained with reference to FIG. 3A, the target memory address is delivered in a first bus clock cycle and the source path tag is delivered in a second bus clock cycle.

The present invention employs an incremental source path tagging technique that eliminates the need to reserve queue entries during the descent of an access request within the hierarchical data storage system, provides enhanced queue utilization, and enables more flexible data scarfing capability. The system depicted in FIG. 2 provides such a tagging structure that permits progressive source tag development as the access request is snooped at each level of the data storage hierarchy.

With reference to the data processing system depicted in FIG. 2, cache memory devices 104a, 104b, 108a, and 110a, are each assigned a fixed identification code that is unique within a given level of the data storage hierarchy. For example, if the number of L2 caches within the processing system depicted in FIG. 1 is eight, L2 cache 108a may be assigned a three-bit device identification tag within a device identification register 224 that is unique with respect to the tags assigned to the other seven L2 caches. Such device identification codes are stored by and are programmable from within registers 216, 224, and 230.

Figure 3A:
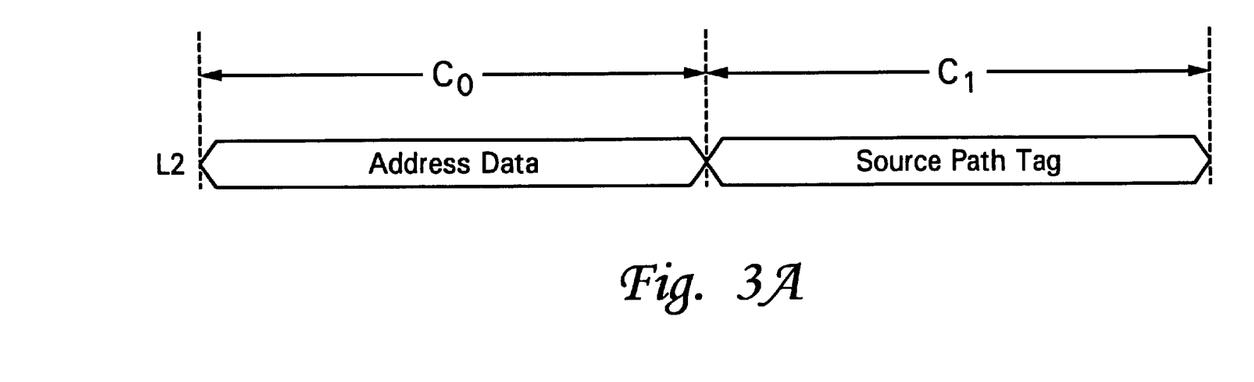
FIG. 3A is a timing diagram depicting a data access request transaction in accordance with a preferred embodiment of the present invention.
Figure 3B:
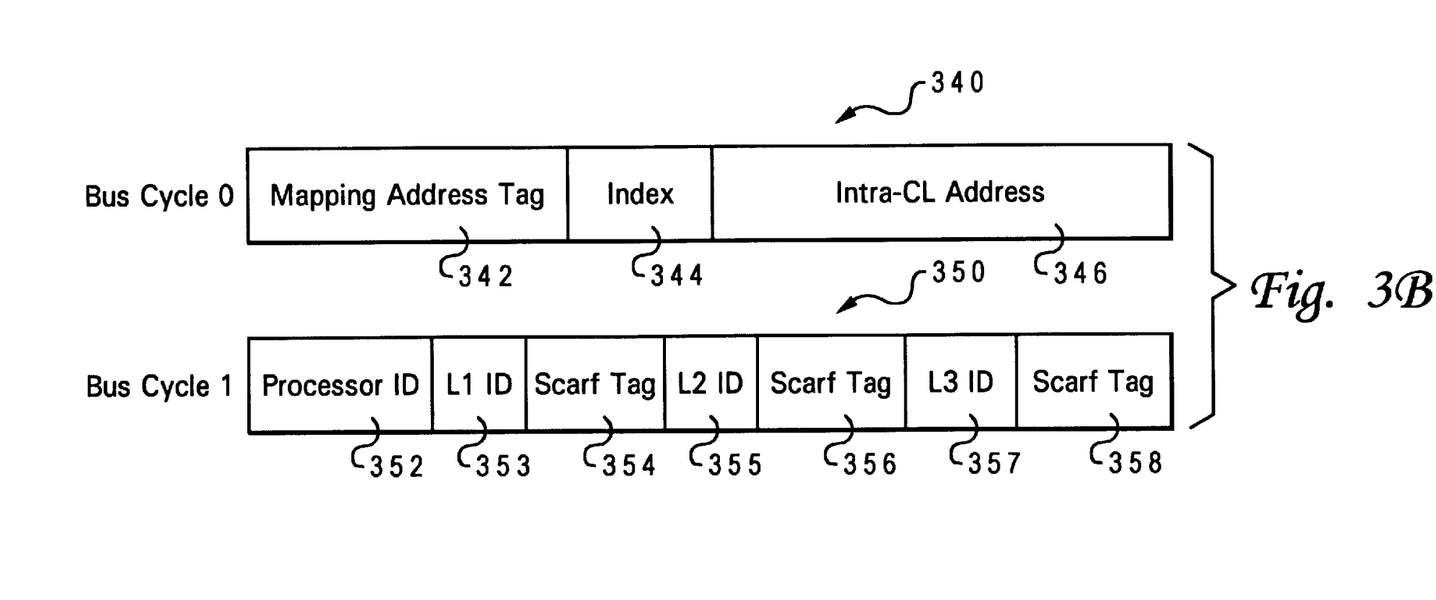
FIG. 3B illustrates data structures employed within a data access request in accordance with a preferred embodiment of the present invention.

FIGS. 3A and 3B depict a timing diagram and corresponding data access request data structure, respectively, employed in accordance with a preferred embodiment of the present invention. In the exemplary embodiment, a data access request is delivered from L2 cache 108a onto system bus 112 in two bus cycles. However, the data access request operation as depicted in FIGS. 3A and 3B may be employed for transmission on any bus by any storage device through which the request passes. Similarly, the data access operation is a READ in the exemplary embodiment, but may be any data access operation (e.g., WRITE, etc.).

As illustrated in FIG. 3A, the address associated with the data access request is received on a first bus clock cycle, $C_0$, while the source path tag is received on a second bus clock cycle, $C_1$. Upon receipt of the read request during bus clock cycles $C_0$ and $C_1$, L2 cache 108a determines whether or not a valid copy of the requested data is included within its own storage. If a cache miss occurs within L2 cache 108a for the read request, the request must be forwarded to system bus 112 wherein snoopers for data storage devices examine the request. Prior to forwarding the access request onto system bus 112, L2 cache controller 222 appends a device identification code stored within register 224 onto the source path tag. An exemplary source path tag data structure 350 and its accompanying target address data structure 340 are depicted in FIG. 3B.

As depicted in FIG. 3B, source path tag 350 includes a processor identification field 352, an L1 identification field 353, an L2 identification field 355, and an L3 identification field 357. For an access request initiated by processor 102a, processor identification field 352 includes the queue identification tag for entry 206 of queue 204 in which the pending data access transaction is stored. L1 identification field 353 is designated to record the device identification tag for L1 cache 104a in the case of a cache miss at L1 cache 104a. Proceeding the previous example wherein a miss occurs upon receipt of the access request at L2 cache 108a, the device identification code assigned to L2 cache 108a is written into L2 identification field 355 prior to the request being forwarded to system bus 112. Thus, as the access request is snooped by L3 cache 110a on system bus 112, the source path tag has an encoded history of the devices that will process or otherwise forward the corresponding data access response.

Assuming an indexed cache organization, a portion of the system address for a cache line are treated as a tag, another portion of the system address is treated as the index, and the remaining bits are an intra-cache line address. As further illustrated in FIG. 3B the target address data structure 340 includes a cache line address tag 342, an index 344, and an intra-cache line address 346. Index field 344 is employed by a cache directory (depicted in FIG. 4) and the cache memory to locate congruence classes. The cache directory stores tags for cache lines contained within particular congruence classes, and compares the tag of a target address to the tags within the congruence class. If a match is identified, the corresponding cache line within the cache memory is the target data and a cache hit has occurred.

Figure 4:
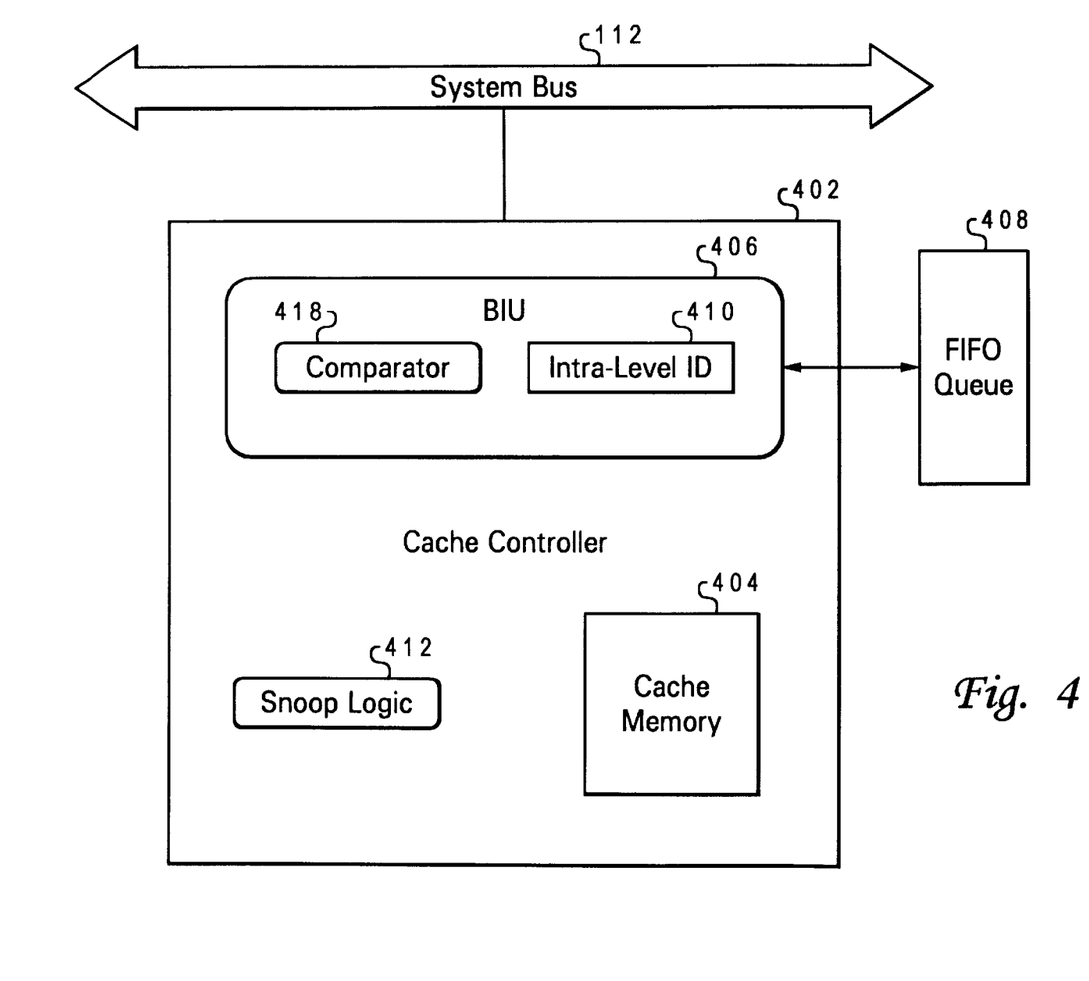
FIG. 4 depicts a diagram of a storage device that employs progressive tagging to manage data access transactions in accordance with a preferred embodiment of the present invention.

With reference now to FIG. 4, there is illustrated a diagram of a storage device that eliminates the need for reserved vertical queuing of data access requests and provides for enhanced scarfing capability in accordance with a preferred embodiment of the present invention. The elements depicted are equally applicable in L2 caches 108a–108b, L1 caches 104a–104b, and L3 caches 110a–110n. A cache controller 402 receives and transmits operations relating to data within a cache memory 404 from upstream and downstream buses through a BIU 406. A directory lookup (not depicted) is employed to locate cache lines within cache memory 404. Addition logic presumably incorporated within cache controller 402 determines the status of current cache lines to implement the replacement policy for updating cache lines within cache memory 404. Snoop logic 412 detects operations initiated by a horizontal storage device (i.e., another L2 cache for L2 caches 108a–108n, and another L3 cache for L3 caches 110a–110n). Snoop logic 412 also controls the snoop response driven by the respective L2 cache in response to snooped operations.

As explained with reference to FIG. 2, a data access request is processed during its descent through the memory hierarchy by incrementally adding device identification codes onto the source path tag such that when the target address is located, the data access response can be returned to the data storage devices identified in the source path tag and also to the original source of the transaction. Assuming with reference to FIG. 4 that a hit occurs within cache controller 402, BIU 406 formulates and delivers a response onto a data bus within system bus 112 that includes the source path tag and the target address along with the requested data. Since the target address line has been located and the source path has ended, BIU 406 does not append a device identification tag 410 to the source path tag. The resulting data access response is delivered back up through the memory hierarchy to the source device.

The information encoded within the returned source path tag enables the response to be properly recognized and processed by intermediate devices as it is routed to the original source device. For example, in a data storage system employing inclusive vertical memory coherency, each memory level from the L1 through system memory must include all data stored within the lower levels. Therefore, if, in the data processing systems depicted in FIGS. 1 and 2, a read request from processor 102a must be forwarded to system memory 114 before registering a data hit, L3 cache 110a and L2 cache 108a must also store the requested data if the data is to be cached in L1 cache 104a.

With reference again to FIG. 4, when a hit occurs within a data storage device that is downstream of cache controller 402 in the source request path, the access response is delivered onto a data bus within system bus 112. Upon receipt of the data access response on system bus 112, which acts as a snoop node for all attached data storage devices, a comparator device 418 compares a predesignated bit field within the source path tag with device identification tag 410 to determine whether or not a match exists. If no match exists, the access response is ignored by BIU 406. If a match is found, the access response is forwarded to an upstream data bus and possibly processed by cache controller 402. If it is determined by BIU 406 that the upstream bus or device are currently occupied or otherwise unavailable, the access response is stored within a first-in-first-out (FIFO) buffer queue 408 until upstream transmission is possible.

In addition to eliminating the need for vertical queueing of data access transactions, the progressive tagging mechanism of the present invention enables enhanced scarfing capability within hierarchical data storage systems. As utilized herein, "scarfing" refers to the capture of retrieved data by a data storage device that is not within the source data transaction path (i.e., not a requester or a necessary recipient of the target data). Such a device will be referred to herein as a "third party transactor." Referring to FIG. 1, L2 cache 108n may be a third party transactor with respect to a data access request initiated on processor bus 106a. Situations in which a data storage device acts as a third party transactor often arise in the context of horizontal cache coherency. Examples of cache coherency operations resulting in a storage device acting as a third party transactor which scarfs data are described in co-pending U.S. patent application Ser. No. 09/024,609, filed on Feb. 17, 1998, and titled "Cache Coherency Protocol Having Hovering (H) and Recent (R) States." The content of U.S. patent application Ser. No. 09/024,609 is incorporated herein by reference. Conventional scarfing techniques require that a queue entry containing the system bus tag and the target address be reserved by the third party transactor. The present invention provides a method by which no queue reservation is required for the third party transactor to identify and process a returning data access response.

Figure 5:
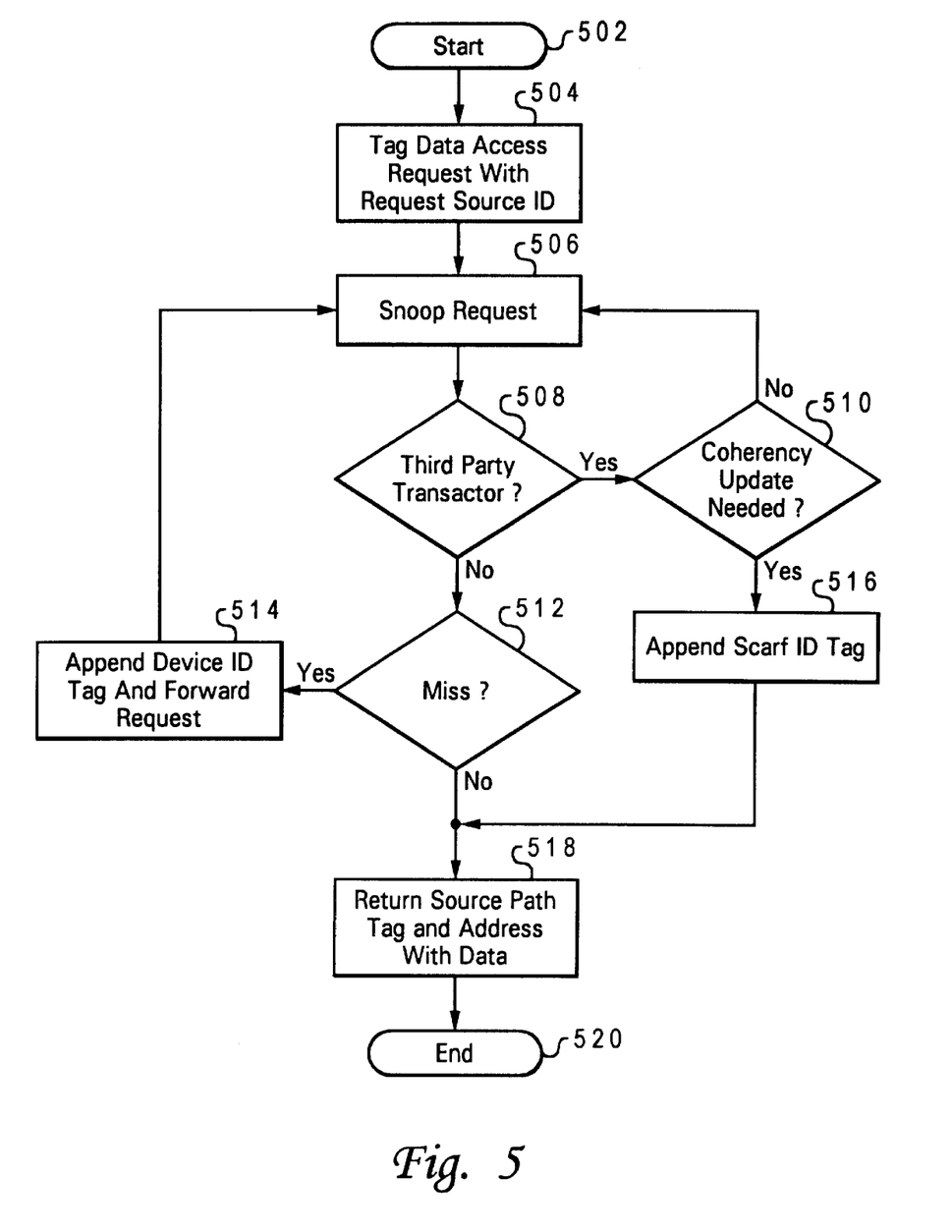
FIG. 5 is a flow diagram illustrating a method for managing a data access request as it descends through a hierarchical data storage system in accordance with the present invention.

A method for enabling a third party transactor to scarf data during a data access transaction is described below with reference to FIGS. 5 and 6. Referring to FIG. 5, there is depicted a flow diagram illustrating a method for managing a data access request as it descends through a hierarchical data storage system in accordance with the present invention. The process begins as shown at step 502 and proceeds to step 504, which depicts encoding a request source identification tag onto the source path tag of a data access request. Next, the data access request is snooped at a snoop node as illustrated at step 506. If, as depicted at steps 508 and 510, the snooping device is an eligible third party transactor, a determination is made of whether or not a data scarf is desired in light of the coherency state of the cache line associated with the requested data. If so, and as illustrated at step 516, a scarf identification tag is appended to the source path tag. Referring back to FIG. 3B, exemplary source path tag 350 includes three scarf tag fields 354, 356, and 358. Scarf tag field 354 is designated for a scarf tag at the L1 level of hierarchy, while scarf tag fields 356 and 358 are designated for scarf tags at the L2 and L3 levels, respectively. If, for example, L2 cache 108n is a potential third party transactor wishing to scarf data from a READ transaction initiated from processor bus 106a, then at step 516, L2 cache 108n will append its device identification tag within scarf tag field 356.

If the snooping device is within the primary data transaction path (i.e., not a potential third party transactor), then as illustrated at step 512, the device will determine whether or not it can accommodate the access request. In response to an access miss, the device identification tag assigned to the device is appended to the source path tag in the appropriate field as shown at step 514. After the device identification tag has been added to the source path tag, the access request is forwarded and snooped at the next snoop node (step 506). As depicted at steps 512 and 518, when the access request is able to be accommodated at a particular storage device (i.e., an access hit), a data access response comprising the source path tag, the target address, and the data are returned to the request source and the process ends at step 520.

Figure 6:
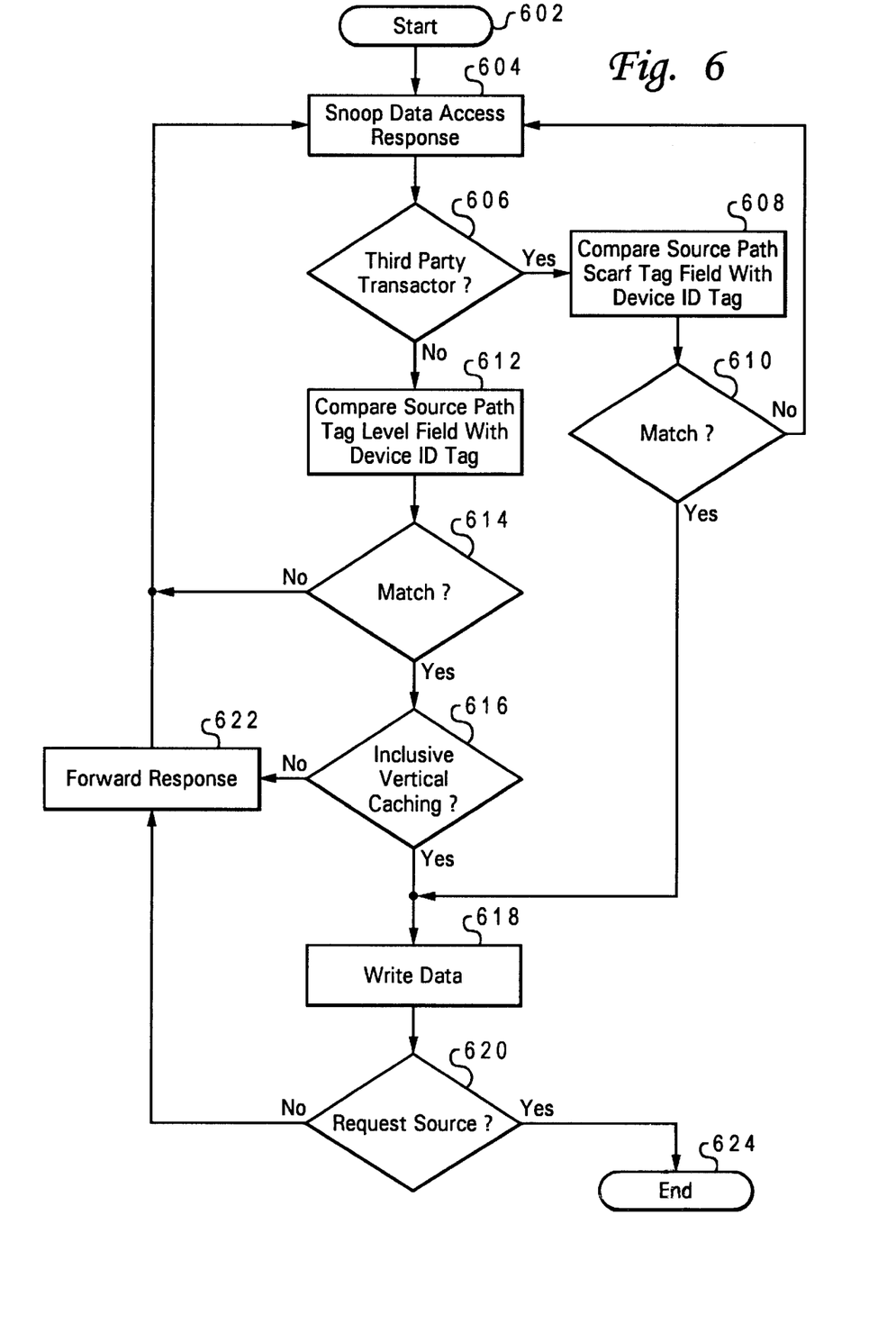
FIG. 6 is a flow diagram depicting a method for managing a data access response as it returns to a request source in accordance with a preferred embodiment of the present invention.

Referring to FIG. 6, there is illustrated a flow diagram depicting a method for managing a data access response as it returns to the request source in accordance with a preferred embodiment of the present invention. The process begins as shown at step 602 and proceeds to step 604, which depicts a storage device snooping a data access response constructed as described with reference to FIG. 5. If, as illustrated at steps 606 and 608, the snooping device is a potential third party transactor, the scarf tag field designated for the memory level at which the snooper resides is compared with the snoopers device identification tag. If a match is found at step 610, the process continues at step 618 with the snoop device writing the target data into its memory.

If the snooping device is within the primary data transaction path (i.e., not a potential third party transactor), then as illustrated at step 612 the device identification tag of the snooping device is compared with the designated tag field within the source path tag. If, as depicted at steps 614 and 616, the contents of the tag field match the device identification tag and the data storage system employs inclusive vertical caching, the target data is written into the memory of the snooping device as illustrated at step 618. If a match is found at step 614, but the system does not employ inclusive vertical caching, the access response is simply forwarded as shown at step 622 assuming the next bus or device is currently available. If as depicted at steps 620 and 624, the snooping device is the request source device (a requesting processor from which the transaction originated, for example), the process ends as shown at step 624. Otherwise the access response is forwarded and again snooped at the next level within the source transaction path as illustrated at steps 622 and 604.

A method and system have been disclosed for processing a data access transaction within a hierarchical data storage system. Software written according to the present invention is to be stored in some form of computer readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing a data access transaction within a hierarchical data storage system, said method comprising:

delivering a data access request from a source device to a plurality of data storage devices within said hierarchical data storage system, wherein said data access request includes a source path tag; and adding at least one device identification tag to said source path tag, wherein said at least one device identification tag uniquely identifies a data storage device within a given level of said hierarchical data storage system such that said data access transaction can be processed in accordance with source path information that is incremental encoded as said data access request traverses said hierarchical data storage system.

2. The method of claim 1, wherein said step of adding at least one device identification tag to said source path tag comprises, in response to a cache miss at a given data storage device among said plurality of data storage devices, appending a device identification tag that uniquely identifies said given data storage device within a given level of said hierarchical data storage system to said source path tag.

3. The method of claim 2, wherein said step of appending a device identification tag is preceded by a step of detecting said data access request at a snoop node from which said given data storage device receives incoming data access requests.

4. The method of claim 2, wherein said step of appending a device identification tag is followed by a step of forwarding said data access request to a next snoop node within said hierarchical data storage system.

5. The method of claim 2, further comprising associating a device identification field within said source path tag with said given level of said hierarchical data storage system.

6. The method of claim 1, wherein said delivering step comprises delivering said data access request onto an address bus that is shared by said plurality of data storage devices.

7. The method of claim 1, wherein said data access request includes a target address, said method further comprising routing said data access request to a target storage device in accordance with said target address.

8. The method of claim 1, further comprising, in response to a cache hit at a given data storage device among said plurality of data storage devices, routing a data access response to said data access request within said hierarchical data storage system in accordance with said source path tag.

9. The method of claim 8, wherein said step of routing a data access response to said data access request further comprises, upon receipt of said data access response at a given snoop node within said hierarchical data storage system, comparing said source path tag to a device identification tag assigned to said given data storage device to determine whether a match exists.

10. The method of claim 1, wherein said source device is a processor, and wherein said step of delivering a data access request is preceded by the step of encoding a processor identification tag within said source path tag, said processor identification tag identifying said processor as the source of said data access request.

11. The method of claim 10, wherein said processor identification tag identifies a queue within said processor from which said data access transaction was delivered.

12. The method of claim 1, wherein said step of delivering a data access request comprises:

delivering a target address on a first set of one or more bus clock cycles, wherein said target address identifies a target storage device within said hierarchical data storage system; and delivering said source path tag on a second set of one or more bus clock cycles subsequent to said first set of one or more bus clock cycles.

* * * * *